(12) United States Patent
Xin (10) Patent No.: US 10,802,359 B2
(45) Date of Patent: Oct. 13, 2020

(54) DISPLAY PANEL HAVING WIDE AND NARROW VIEWING ANGLE DISPLAY MODES COMPRISING DYE MOLECULES DISPERSED IN A LIQUID CRYSTAL LAYER, DISPLAY DEVICE AND DISPLAY METHOD

(71) Applicant: Shanghai Tianma Micro-Electronics Co., Ltd., Shanghai (CN)

(72) Inventor: Longcai Xin, Shanghai (CN)

(*) Notice: Subject to any disclaimer, the term of this patent is extended or adjusted under 35 U.S.C. 154(b) by 0 days.

(21) Appl. No.: 16/672,520

(22) Filed: Nov. 4, 2019

(65) Prior Publication Data
US 2020/0064666 A1 Feb. 27, 2020

(30) Foreign Application Priority Data
Jun. 29, 2019 (CN) .......................... 2019 1 0580660

(51) Int. Cl.
*G02F 1/1347* (2006.01)
*G02F 1/137* (2006.01)
*G02F 1/13* (2006.01)

(52) U.S. Cl.
CPC ........ *G02F 1/13475* (2013.01); *G02F 1/1323* (2013.01); *G02F 1/1347* (2013.01); *G02F 1/13737* (2013.01); *G02F 1/137* (2013.01); *G02F 1/13725* (2013.01)

(58) Field of Classification Search
CPC ............. G02F 1/13475; G02F 1/13725; G02F 1/1323; G02F 1/137; G02F 1/13737
See application file for complete search history.

(56) References Cited

U.S. PATENT DOCUMENTS

| 6,266,108 B1* | 7/2001 | Bao .................. G02B 6/003 349/113 |
| 10,649,248 B1* | 5/2020 | Fan Jiang ............. H04N 7/141 |
| 2004/0201793 A1* | 10/2004 | Anandan ............ G02F 1/13475 349/61 |
| 2007/0263150 A1* | 11/2007 | Ohishi ................ G02F 1/13725 349/128 |
| 2014/0232960 A1* | 8/2014 | Schwartz ................ B32B 3/30 349/12 |
| 2015/0036085 A1* | 2/2015 | Chen ................. G02F 1/133536 349/99 |
| 2015/0378205 A1* | 12/2015 | Kim .................... G02F 1/13476 349/33 |

(Continued)

FOREIGN PATENT DOCUMENTS

CN          108919552 A     11/2018

*Primary Examiner* — Paul C Lee
(74) *Attorney, Agent, or Firm* — Kilpatrick Townsend & Stockton, LLP (57) ABSTRACT

The present disclosure provides a display panel, display device and display method. Under a wide viewing angle display mode, a first signal is applied to a first electrode and a second electrode, and a long axis of liquid crystal molecules and a long axis of dye molecules are perpendicular to a plane of a first substrate. A relatively large included angle is formed between a polarization direction of emergent light of a first display device and the long axis of the dye molecules. A second signal is applied to the first electrode and the second electrode under a narrow viewing angle display mode, and a long axis of liquid crystal molecules and a long axis of dye molecules form an included angle of 30 to 60 degrees together with the plane of the first substrate.

16 Claims, 8 Drawing Sheets

(56) References Cited

U.S. PATENT DOCUMENTS

2016/0026026 A1\* 1/2016 Kim .................... G02F 1/13394
349/88
2018/0188576 A1\* 7/2018 Xu ........................ G02F 1/1323

\* cited by examiner

DISPLAY PANEL HAVING WIDE AND NARROW VIEWING ANGLE DISPLAY MODES COMPRISING DYE MOLECULES DISPERSED IN A LIQUID CRYSTAL LAYER, DISPLAY DEVICE AND DISPLAY METHOD

CROSS REFERENCES

This application claims priority to Chinese Patent Application No. 201910580660.4, filed on Jun. 29, 2019, which is hereby incorporated by reference in its entirety.

FIELD

The present disclosure relates to the field of displays, and particularly to a display panel, display device and display method.

BACKGROUND

With the continuous improvement of display technologies, viewing angles of displays may all reach 80 degrees or more. People also do not hope that displayed contents may be watched from all viewing angles on some application occasions while enjoying the visual experience brought by a large viewing angle, so at the moment, the display needs to be switched to a narrow viewing angle. In one embodiment, in an in-vehicle display system, when a driver is driving, the driver should be prevented from watching a display panel that is not related to driving, so as to avoid the influence on the driving safety.

SUMMARY

The embodiments of the present disclosure provide a display panel, display device and display method.

One embodiment of the present disclosure provides a display panel, including: a first display device, a second display device located on a light-exiting side of the first display device, and a polarizer located between the first display device and the second display device.

The second display device includes: a first substrate and a second substrate which are opposite to each other, a first liquid crystal layer located between the first substrate and the second substrate, dye molecules dispersed in the first liquid crystal layer, a first electrode located between the first liquid crystal layer and the first substrate, and a second electrode located between the first liquid crystal layer and the second substrate.

The first electrode and the second electrode are configured to enable a long axis of the dye molecules to be perpendicular to a plane of the first substrate via a first signal applied to the first electrode and the second electrode under a wide viewing angle display mode; and the first electrode and the second electrode are configured to enable the long axis of the dye molecules and the plane of the first substrate to form an included angle of 30 to 60 degrees via a second signal applied to the first electrode and the second electrode under a narrow viewing angle display mode.

One embodiment of the present disclosure provides a display device, including any of the above display panels.

One embodiment of the present disclosure provides a display method of the above display device, including: applying the first signal to the first electrode and the second electrode of the second display device under the wide viewing angle display mode where the long axis of dye molecules is perpendicular to the plane of the first substrate; and applying the second signal to the first electrode and the second electrode of the second display device under the narrow viewing angle display mode where the long axis of the dye molecules and the plane of the first substrate form the included angle of 30 to 60 degrees.

BRIEF DESCRIPTION OF THE DRAWINGS

In order to describe the embodiments of the present disclosure more clearly, the drawings are illustrating the embodiments of the present disclosure which are briefly described below.

DETAILED DESCRIPTION OF THE EMBODIMENTS

A display panel, display device and display method thereof which are provided by the embodiments of the present disclosure are specifically described below in combination with the drawings. The thicknesses and shapes of all components in the drawings do not reflect the substantial proportion of the display device, and are only for the purpose of illustrating the contents of the present disclosure.

Figure 1:
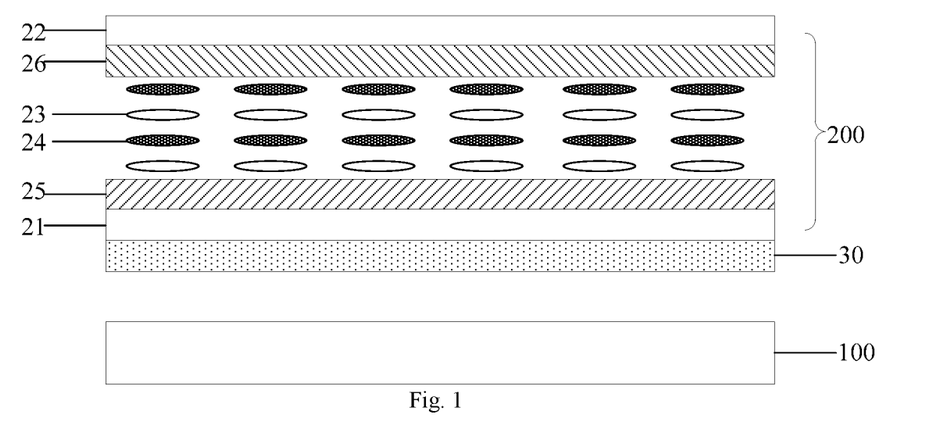
FIG. 1 is a cross-sectional structural schematic diagram I of a display panel according to the embodiment of the present disclosure.

In embodiments of the present disclosure, a display panel is provided. FIG. 1 is a cross-sectional structural schematic diagram of the display panel according to the embodiments of the present disclosure. As shown in FIG. 1, the display panel provided by the embodiment of the present disclosure includes: a first display device 100, a second display device 200 located on a light-exiting side of the first display device 100, and a polarizer 30 located between the first display device 100 and the second display device 200.

As shown in FIG. 1, the second display device 200 includes: a first substrate 21 and a second substrate 22 which are opposite to each other, a first liquid crystal layer 23 located between the first substrate 21 and the second substrate 22, dye molecules 24 dispersed in the first liquid crystal layer 23, a first electrode 25 located between the first liquid crystal layer 23 and the first substrate 21, and a second electrode 26 located between the first liquid crystal layer 23 and the second substrate 22.

In the second display device, the dye molecules 24 are dispersed in the first liquid crystal layer 23 to form a guest-host liquid crystal cell with liquid crystal molecules in the first liquid crystal layer 23 serving as a host and the dye molecules serving as a guest. The dye molecules 24 are dissolved in the directionally aligned first liquid crystal layer 23 and aligned in the same direction as the liquid crystal molecules in the first liquid crystal layer 23, and the long axis direction of the liquid crystal molecules is parallel to the long axis direction of the dye molecules 24. When the long axis direction of the liquid crystal molecules, serving as the host, in the first liquid crystal layer 23 changes under the action of an electric field, the long axis of the dye molecules 24 also changes therewith. The absorption of the dye molecules 24 to visible light is different along the long axis direction and the short axis direction. When the visible light having a polarization direction parallel to the long axis direction of the dye molecules is emitted to the dye molecules, the absorption rate of the dye molecules to the visible light is maximized, and the light is almost completely absorbed; when the visible light having a polarization direction perpendicular to the long axis direction of the dye molecules is emitted to the dye molecules, the absorption rate of the dye molecules to the visible light is minimized, and almost no absorption occurs; when the polarization direction of the visible light is in a middle state of being parallel and perpendicular to the long axis of the small dye molecules, the absorption rate of the dye molecules to the visible light is dynamically adjustable. In the embodiment of the present disclosure, the above properties of the dye molecules may be used to control flip of the liquid crystal molecules in the first liquid crystal layer 23 through the electric field to drive the dye molecules 24 to flip at different angles, thereby achieving modulation of the transmittance of light with different exiting angles of the display panel.

In the embodiments of the present disclosure, a first signal is applied to the first electrode 25 and the second electrode 26 under a wide viewing angle display mode where the long axis of the dye molecules 24 is perpendicular to a plane of the first substrate 21; and a second signal is applied to the first electrode 25 and the second electrode 26 under a narrow viewing angle display mode where the long axis of the dye molecules 24 and the plane of the first substrate 21 form an included angle of 30 to 60 degrees.

Figure 2:
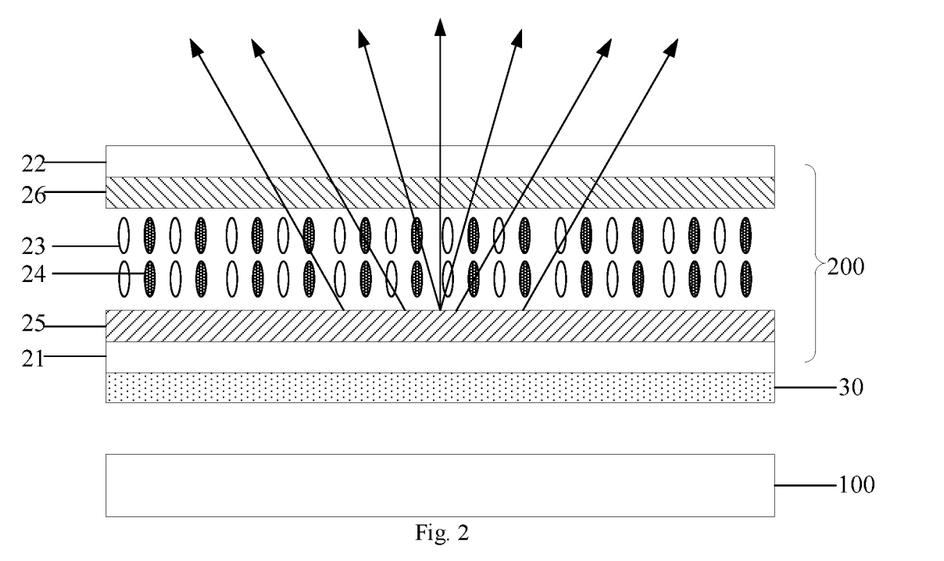
FIG. 2 is a light-emitting schematic diagram under a wide viewing angle display mode according to the embodiment of the present disclosure.
Figure 3:
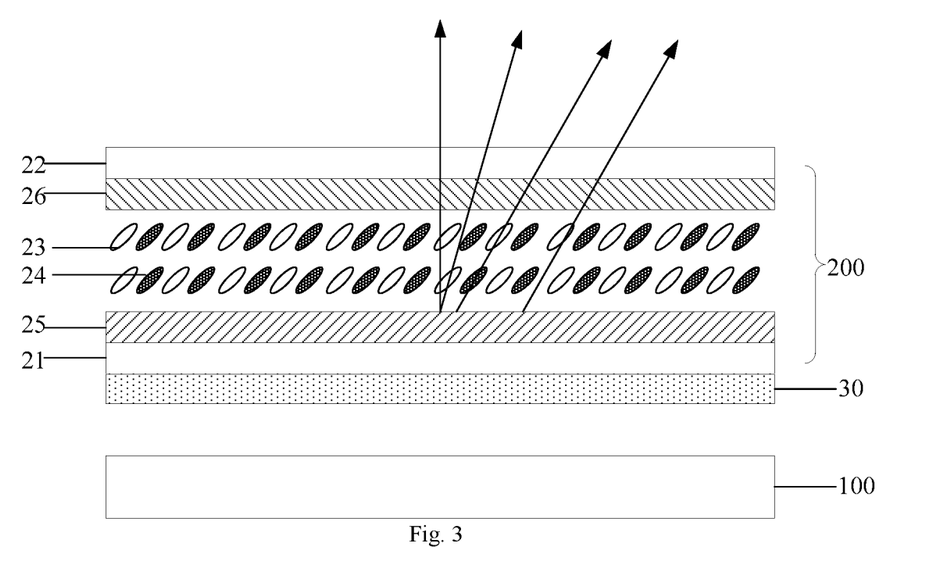
FIG. 3 is a light-emitting schematic diagram under a narrow viewing angle display mode according to the embodiment of the present disclosure.

In one embodiment, FIG. 2 and FIG. 3 respectively illustrate the light-emitting schematic diagrams under the wide viewing angle display mode and the narrow viewing angle display mode.

As shown in FIG. 2, the first signal is applied to the first electrode 25 and the second electrode 26 under the wide viewing angle display mode, and at the moment, the long axis of the liquid crystal molecules and the long axis of the dye molecules 24 in the first liquid crystal layer 23 are perpendicular to the plane of the first substrate 21; emergent light of the first display device 100 generates polarized light with a polarization direction parallel to the plane of the first substrate 21 after passing through the polarizer 30; a relatively large included angle is formed between the long axis of the dye devices 24 and the polarization direction of the polarized light, and no light or little light will be absorbed; and there is no difference between a viewing angle formed by the emergent light and a display viewing angle of the first display device 100, and displaying is performed under the wide viewing angle mode.

As shown in FIG. 3, the second signal is applied to the first electrode 25 and the second electrode 26 under the narrow viewing angle display mode, and at the moment, the long axis of liquid crystal molecules and the long axis of the dye molecules 24 in the first liquid crystal layer 23 form an included angle of 30 to 60 degrees together with the plane of the first substrate 21; emergent light of the first display device 100 generates polarized light with a polarization direction parallel to the plane of the first substrate 21 after passing through the polarizer; when the included angle between the long axis of the dye molecules 24 and the plane of the first substrate 21 is maintained at any value within 30 to 60 degrees, the long axis direction of the dye molecules 24 will be parallel to or closely parallel to the polarization direction of part of the emergent light, and at the moment, this part of light may be absorbed by the dye molecules, so that a display picture of the display panel may not be watched from a watching position corresponding to this part of light, and displaying is performed under the narrow viewing angle mode.

In some implementations, the liquid crystal molecules in the first liquid crystal layer 23 may be either positive liquid crystal molecules or negative liquid crystal molecules.

Figure 4:
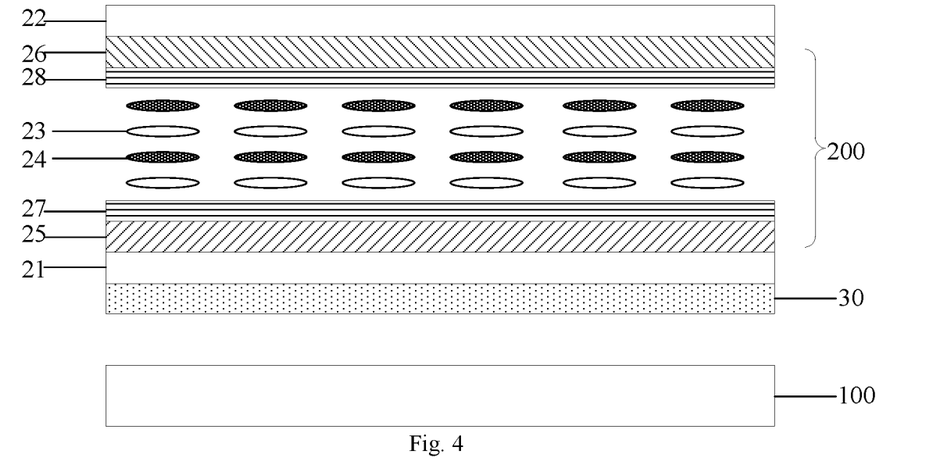
FIG. 4 is a schematic diagram I of initial alignment of a first liquid crystal layer according to the embodiment of the present disclosure.

FIG. 4 is a schematic diagram of initial alignment of the liquid crystal molecules which are positive liquid crystal molecules in the first liquid crystal layer 23. As shown in FIG. 4, a first alignment layer 27 is arranged on the side, facing the first electrode 25, of the first liquid crystal layer 23, and a second alignment layer 28 is arranged on the side, facing the second electrode 26, of the first liquid crystal layer 23. The alignment directions of the first alignment layer 27 and the second alignment layer 28 are the same, and are both parallel to the plane of the first substrate 21. Therefore, the positive liquid crystal molecules in the first liquid crystal layer 23 are initially aligned to be parallel to the plane of the first substrate 21 under the action of the first alignment layer 27 and the second alignment layer 28, and the long axis direction of the dye molecules 24 is parallel to the long axis direction of the positive liquid crystal molecules. Under the action of the electric field, the positive liquid crystal molecules have a flip trend in which the long axis is parallel to the direction of the electric field. In the embodiment of the present disclosure, the first electrode 25 and the second electrode 26 are arranged on both sides of the first liquid crystal layer 23, and when an electric signal is applied to the first electrode 25 and the second electrode 26, an electric field perpendicular to the plane of the first substrate 21 may be generated. Therefore, if it is desired that the positive liquid crystal molecules flip in different angles under the action of the electric field, it is necessary to make the initial alignment of the positive liquid crystal molecules perpendicular to the direction of the electric field even if the initial alignment of the positive liquid crystal molecules is parallel to the plane of the first substrate 21.

Figure 5:
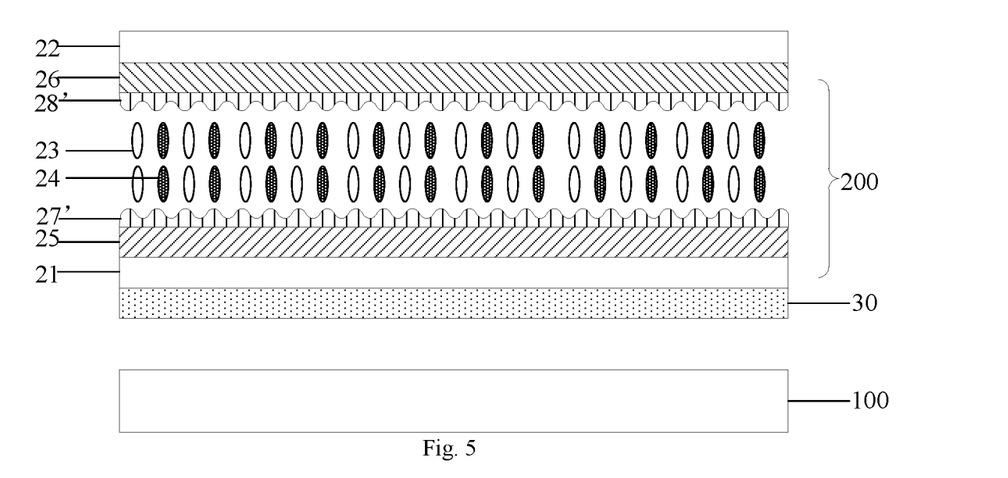
FIG. 5 is a schematic diagram II of initial alignment of a first liquid crystal layer according to the embodiment of the present disclosure.

FIG. 5 is a schematic diagram of initial alignment of the liquid crystal molecules which are negative liquid crystal molecules in the first liquid crystal layer 23. As shown in FIG. 5, a third alignment layer 27' is arranged on the side, facing the first electrode 25, of the first liquid crystal layer 23, and a fourth alignment layer 28' is arranged on the side, facing the second electrode 26, of the first liquid crystal layer 23. The alignment directions of the third alignment layer 27' and the fourth alignment layer 28' are the same, and are both perpendicular to the plane of the first substrate 21. Therefore, the negative liquid crystal molecules in the first liquid crystal layer 23 are initially aligned to be perpendicular to the plane of the first substrate 21 under the action of the third alignment layer 27' and the fourth alignment layer 28', and the long axis direction of the dye molecules 24 is parallel to the long axis direction of the negative liquid crystal molecules. Under the action of the electric field, the negative liquid crystal molecules have a flip trend in which the long axis is perpendicular to the direction of the electric field. In the embodiment of the present disclosure, the first electrode 25 and the second electrode 26 are arranged on both sides of the first liquid crystal layer 23, and when an electric signal is applied to the first electrode 25 and the second electrode 26, an electric field perpendicular to the plane of the first substrate 21 may be generated. Therefore, if it is desired that the negative liquid crystal molecules flip in different angles under the action of the electric field, it is necessary to make the initial alignment of the negative liquid crystal molecules parallel to the direction of the electric field even if the initial alignment of the negative liquid crystal molecules is perpendicular to the plane of the first substrate 21.

Figure 6:
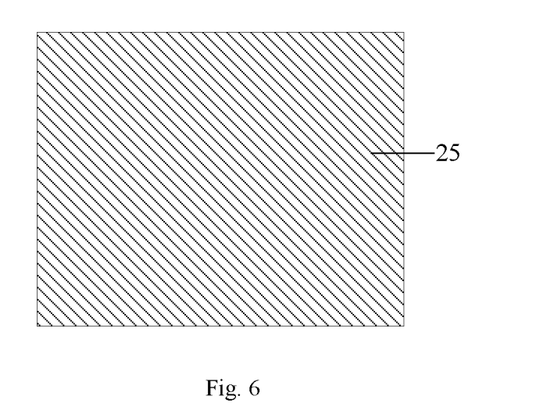
FIG. 6 is a structural top view of a first electrode according to the embodiment of the present disclosure.

In one embodiment, according to the structural top view of a first electrode 25 as shown in FIG. 6 (the structural top view of the second electrode 26 is the same as that of the first electrode 25). The first electrode 25 and the second electrode 26 in the display panel provided by the embodiment of the present disclosure may be planar electrodes. When the first electrode 25 and the second electrode 26 are the planar electrodes, an electric field perpendicular to the plane of the first substrate 21 may be generated, and the electric field generated at each position is uniform, and the liquid crystal molecules in the first liquid crystal layer 23 may simultaneously flip at the same angle towards the same direction under the action of a perpendicular electric field. The dye molecules 24 in the first liquid crystal layer 23 may flip with the liquid crystal molecules in the first liquid crystal layer 23, so that the emergent light from one side, which is bounded by a center line, of the display panel is absorbed by the flipped dye molecules 24 to realize a narrow viewing angle on this side, and the light from the other side is normally emitted to realize normal displaying of the other side. This narrow viewing angle display mode is suitable for in-vehicle displaying. Under the narrow viewing angle display mode, the narrow viewing angle mode is realized for the light on one side of a driver, and the normal displaying is performed on the light side of a co-pilot position, thereby avoiding the interference of a display picture to the driving of the driver and ensuring the driving safety. In practical applications, the first electrode 25 and the second electrode 26 may be made of a transparent conductive material, such as indium tin oxide, to make a full-surface structure, so that when a voltage is applied to the first electrode 25 and the second electrode 26, the liquid crystal molecules and the dye molecules in the first liquid crystal layer simultaneously flip at the same angle towards the same direction conveniently, thereby achieving the adjustment of the transmittance of the emergent light. The first electrode 25 and the second electrode 26 are made of the full-surface transparent conductive material to also avoid the influence of the electrodes on the transmittance.

Figure 7:
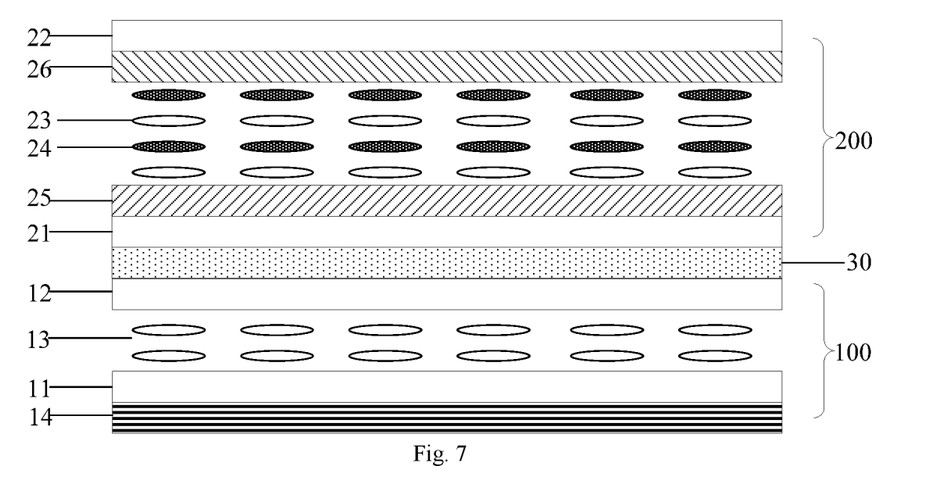
FIG. 7 is a cross-sectional structural schematic diagram II of a display panel according to the embodiment of the present disclosure.

In one embodiment, the first display device 100 located on a light entering side of the second display device 200 may adopt a display device with different display modes. FIG. 7 is another cross-sectional structural schematic diagram of a display panel according to the embodiment of the present disclosure. As shown in FIG. 7, a first display device 100 includes: a third substrate 11 and a fourth substrate 12 which are opposite to each other, a second liquid crystal layer 13 located between the third substrate 11 and the fourth substrate 12, and a lower polarizer 14 located on the side, deviated from the second liquid crystal layer 13, of the third substrate 11. The polarizer 30 is located between the first substrate 21 and the fourth substrate 12. The polarization directions of the lower polarizer 14 and the polarizer 30 are perpendicular to each other. When the first display device and the second display device are liquid crystal display devices, the polarizer 30 serves as an upper polarizer of the first display device. For a liquid crystal display device, the polarization directions of polarizers located on two sides of the liquid crystal display device need to be perpendicular. When voltage control is applied to the liquid crystal display device, the liquid crystal molecules in the liquid crystal display device flip, so that the vibration direction of polarized light downwards passing through the lower polarizer 14 is rotated, and then a difference in transmittance is generated when the light passes through the polarizer 30, thus achieving the modulation of the light transmittance. The first display device 100 may adopt the liquid crystal display device, and both sides of the liquid crystal display device need to be provided with polarizers with mutually perpendicular polarization directions. The first display device 100 may adopt a display device with a Vertical Alignment (VA) mode, a display device with an In-Plane Switching (IPS) mode, a display device with a Fringe Field Switching (FFS) mode and the like, and is not limited herein.

Figure 8:
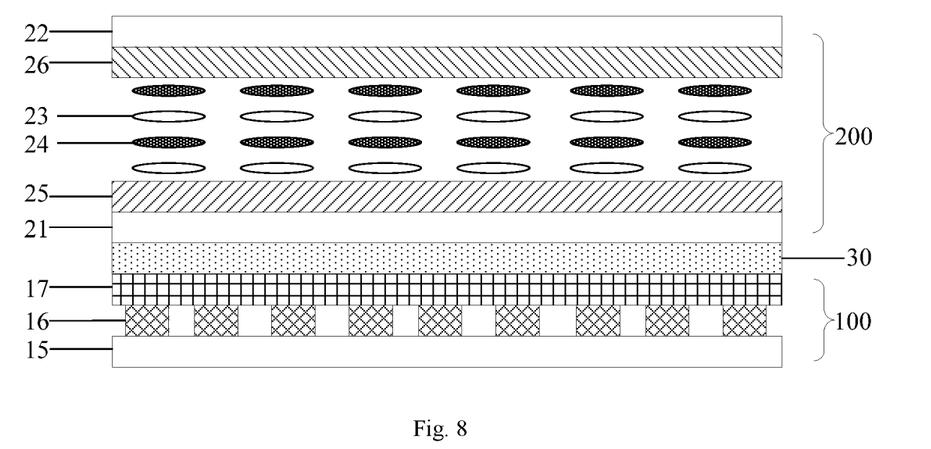
FIG. 8 is a cross-sectional structural schematic diagram III of a display panel according to the embodiment of the present disclosure.

FIG. 8 is another cross-sectional structural diagram of a display panel according to the embodiment of the present disclosure. As shown in FIG. 8, a first display device 100 includes a base substrate 15, an organic light emitting diode component 16 and a phase retarder 17, which are located on the side, facing the polarizer 30, of the base substrate 15. The phase retarder 17 is located between the polarizer 30 and the organic light emitting diode component 16. The first display device 100 may also adopt an organic light emitting diode display device. The organic light emitting diode display device is a self-luminous display device, and does not need to be provided with a backlight device, which is beneficial to thinning the overall device. In order to resist the ambient light reflection and improve the display contrast of the organic light emitting diode display device, a circular polarizer may be arranged on a light-exiting side of the organic light emitting diode display device. The circular polarizer includes a polarizer and a phase retarder, and the polarizer arranged between the two display devices of the display panel provided by the embodiment of the present disclosure may be directly used as one portion of the circular polarizer, so that there is no need to further arrange one layer of polarizer, which is advantageous for further reducing the thickness of the overall device.

According to the display panel provided by the embodiment of the disclosure, by arranging the second display device on the light-exiting side of the first display device and dispersing the dye molecules in the second display device, the dichroism of the dye molecules is used to absorb the emergent light, parallel to the long axis direction of the dye molecules, of the first display device when the dye molecules flip at a specific angle, thereby shielding the display picture at this viewing angle. By applying different signals to the second display device, shielding of the display picture at different viewing angles and switching of the wide and narrow viewing angle display modes may be realized.

One embodiments of the present disclosure, a display device is provided. The display device includes any of the above display panels. The principle of the display device for solving the problem is similar to that of the above display panel, so that the implementation of the display device may refer to the implementation of the above display panel.

Figure 9:
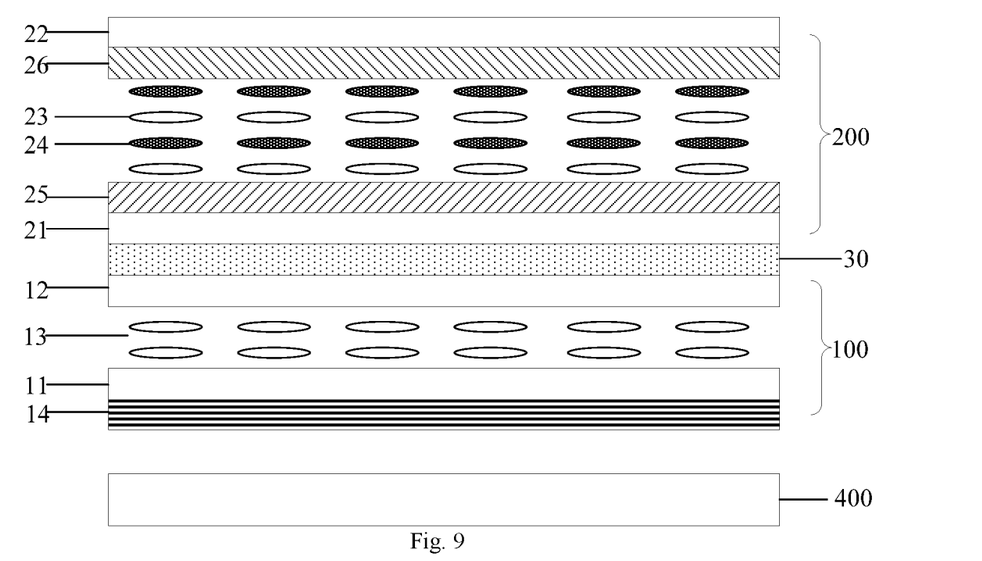
FIG. 9 is a cross-sectional structural schematic diagram of a display device according to the embodiment of the present disclosure.

FIG. 9 is a cross-sectional structural schematic diagram of a display device according to the embodiment of the present disclosure. As shown in FIG. 9, when the first display device 100 is a liquid crystal display device, the display device further includes: a backlight device 400 located on the side, deviated from on the second display device 200, of the first display device 100. When the first display device 100 is an organic light emitting diode display device, it is not necessary to arrange a backlight device separately. In practical applications, display devices of different structures may be used according to the application scenes and needs, and are not limited herein.

Figure 10:
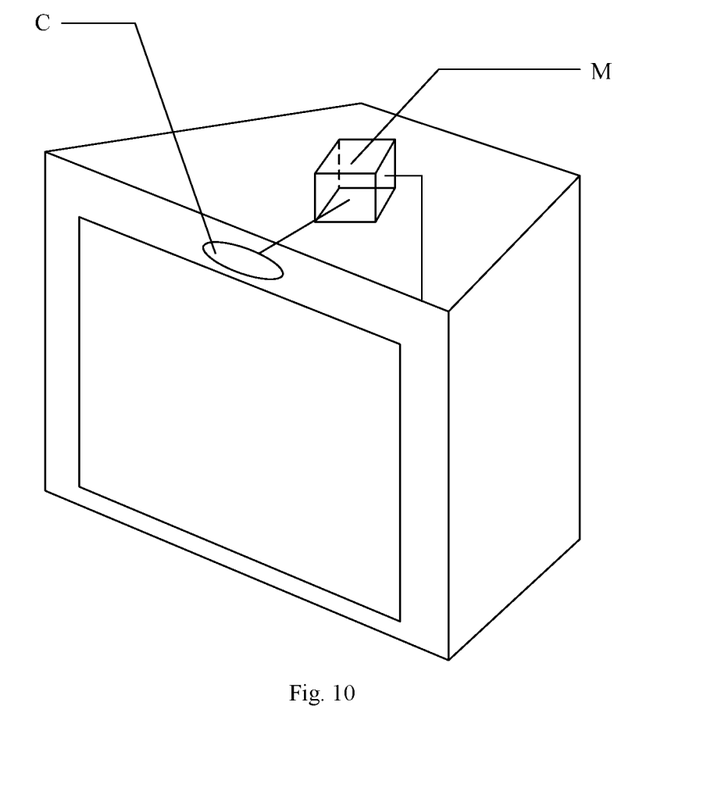
FIG. 10 is a structural schematic diagram of a display device according to the embodiment of the present disclosure.

FIG. 10 is a structural schematic diagram of a display device according to the embodiment of the present disclosure. As shown in FIG. 10, the display device provided by the embodiment of the present disclosure is used for in-vehicle displaying, and the display device further includes: a camera C arranged on any rim of the display device, and a processor M connected to the camera C. The camera C is configured to acquire a driver image and transmit the driver image to the processor M, and the processor M is configured to determine a viewing angle formed between the face of the driver and a display surface of the display device according to the image acquired by the camera and control the display device to enter a narrow viewing angle display mode corresponding to the viewing angle according to the determined viewing angle, so that the driver is unable to watch a display picture of the display device.

The display device provided by the embodiment of the present disclosure is suitable for being used in an in-vehicle display system. By controlling a flip angle of the liquid crystals of the second display device in the display device, the dye molecules may be rotated together with the liquid crystal molecules, so that the display picture of the display device may not be watched at a specific viewing angle on one side of the display device. In the driving process of the driver, the display picture of the display device is not suitable for being watched by the driver since it easily distracts the attention of the driver, and there is a potential safety hazard. At the moment, the display device may be switched to the narrow viewing angle display mode. Firstly, the driver image is acquired through the camera C to determine a viewing angle formed between the position of the face of the driver and the display surface of the display device. The viewing angles for watching the display picture are different due to different heights of drivers. Therefore, after the viewing angle for watching of the driver is determined at first, the second display device in the display device is controlled through the processor M according to this viewing angle, so that the flip angle of the dye molecules in the second display device may just allow the light emitted to the watching position of the driver to be absorbed, and the driver is unable to watch the display picture of the display device, and the driving safety is ensured. Meanwhile, the dye molecules may only flip towards the same direction, so that a passenger at the co-pilot position will not be affected and may still watch the display picture normally at a viewing angle on the side opposite to the driver. Therefore, a viewing angle switching display mode applied to the in-vehicle display system is realized.

Figure 11:
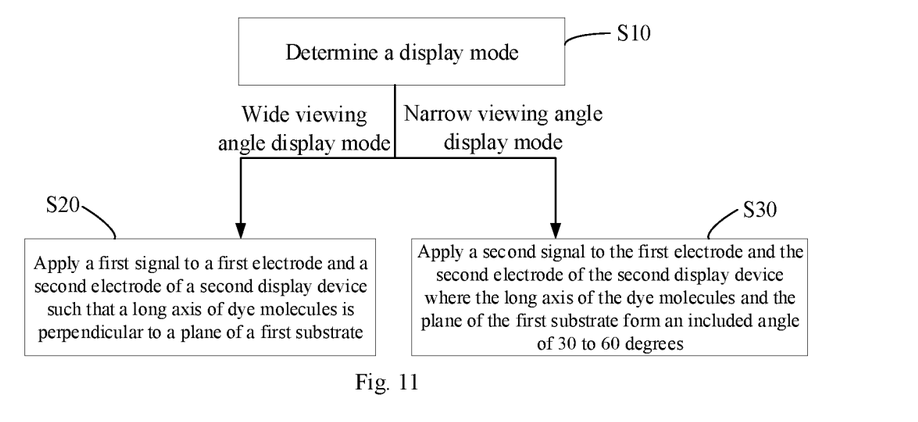
FIG. 11 is a flowchart I of a display method of a display device according to the embodiment of the present disclosure.

One embodiments of the present disclosure, a display method based on any one of the above display devices is provided. FIG. 11 is a flowchart of a display method according to the embodiment of the present disclosure. As shown in FIG. 11, the display method may include that the following operations.

S10: a display mode is determined; operation S20 is performed under a wide viewing angle display mode, and Step S30 is performed under a narrow viewing angle mode.

S20: a first signal is applied to a first electrode and a second electrode of a second display device where a long axis of dye molecules is perpendicular to a plane of the first substrate.

S30: a second signal is applied to the first electrode and the second electrode of the second display device under the narrow viewing angle display mode where the long axis of the dye molecules and the plane of the first substrate form an included angle of 30 to 60 degrees.

The display device provided by the embodiment of the present disclosure includes a first display device, and the second display device located on a light-exiting side of the first display device. The first display device is configured to display an image, and dichromatic dye molecules are dispersed in the second display device. Liquid crystal molecules in the second display device may be caused to flip under the action of an electric field by applying an electric signal to the first electrode and the second electrode of the second display device, thereby driving the dichroism of the dye molecules to flip as well. The first signal is applied to the first electrode and the second electrode under the wide viewing angle display mode, and at the moment, the long axis of the dye molecules is perpendicular to the plane of the first substrate; a relatively large included angle is formed between the polarization direction of emergent light of the first display device and the long axis of the dye molecules, and no light or little light will be absorbed; and there is no difference between a viewing angle formed by the emergent light and a display viewing angle of the first display device, and wide viewing angle displaying is realized. Under the narrow viewing angle display mode, the viewing angle is adjusted as needed. The included angle formed between the long axis of the dye molecules and the plane of the first substrate may be continuously variable by changing the size of the second signal, and then the dye molecules may selectively absorb lights emitted from a viewing angle within 30 to 60 degrees, so that a relatively small included angle is formed between the polarization direction of the emergent light of the first display device and the long axis of the dye molecules, and the emergent light of the first display device at this viewing angle is absorbed by the dye molecules. No display picture is watched, and narrow viewing angle displaying is realized.

The display device provided by the embodiment of the present disclosure may be maintained under the wide viewing angel display mode in an initial state. When the display device needs to be switched to the narrow viewing angle display mode, a corresponding potential is applied to the first electrode and the second electrode of the second display device according to an adjusted viewing angle.

The first liquid crystal layer in the second display device may adopt either positive liquid crystal molecules or negative liquid crystal molecules. When the liquid crystal molecules in the first liquid crystal layer are the positive liquid crystal molecules, if the display device needs to be maintained under the wide viewing angle display mode, it is necessary to make the long axis of the dye molecules in the second display device perpendicular to the plane of the first substrate and make the initial alignment of the positive liquid crystal molecules parallel to the plane of the first substrate, so that a first signal with a relatively high voltage needs to be applied to the first liquid crystal layer of the second display device to allow the positive liquid crystal molecules in the first liquid crystal layer to flip and allow the long axis of the positive liquid crystal molecules and the long axis of the dye molecules to be perpendicular to the plane of the first substrate. If the device is switched to the narrow viewing angle display mode, the flip angle of the positive liquid crystal molecules in the first liquid crystal layer is between 30 degrees and 60 degrees, so that the voltage of the second signal applied at the moment may be less than the voltage of the first signal to cause the included angle formed between the long axis of the positive liquid crystal molecules as well as the long axis of the dye molecules and the plane of the first substrate to be between 30 degrees and 60 degrees.

When the liquid crystal molecules in the first liquid crystal layer are the negative liquid crystal molecules, if the display device needs to be maintained under the wide viewing angle display mode, it is necessary to make the long axis of the dye molecules in the second display device perpendicular to the plane of the first substrate and make the initial alignment of the negative liquid crystal molecules perpendicular to the plane of the first substrate, so that the wide viewing angle displaying may be realized without applying any voltage to the first liquid crystal layer. That is, when the negative liquid crystal molecules are adopted, the voltage of the first signal is 0 V. When the device is switched to the narrow viewing angle display mode, the flip angle of the negative liquid crystal molecules in the first liquid crystal layer is between 30 degrees and 60 degrees, so that a voltage needs to be applied to two sides of the first liquid crystal layer to enable the negative liquid crystal molecules to flip, and a voltage generated by the second signal on the two sides of the first liquid crystal layer is inevitably more than 0 V. Therefore, the voltage of the first signal is less than the voltage of the second signal.

In some embodiments, the polarity of the liquid crystal molecules adopted in the second display device may be selected as needed. The embodiment of the present disclosure does not limit the parameters such as the type and nature of the liquid crystal molecules. When the first liquid crystal layer in the second display device adopts the negative liquid crystals, no voltage needs to be applied to the first liquid crystal layer under the wide viewing angle display mode, and a voltage is applied to the first electrode and the second electrode of the second display device only under the narrow viewing angle display mode, so as to reduce the power consumption.

The display device provided by the embodiment of the present disclosure is suitable for in-vehicle displaying. The display device may be of the structure as shown in FIG. 10. The display device includes: a camera arranged on any rim of the display device, and a processor M connected to the camera. The camera is configured to acquire a driver image and transmit the driver image to the processor, and the processor is configured to determine a viewing angle formed between the face of the driver and a display surface of the display device according to the image acquired by the camera and control the display device to enter a narrow viewing angle display mode corresponding to the viewing angle according to the determined viewing angle, so that the driver may not watch a display picture of the display device. The above viewing angle is an included angle formed between the visual line of the driver and a direction perpendicular to a display panel of the display device.

The display picture interferes with the driver, which may affect the driving safety, so that when the display device provided by the embodiment of the present disclosure is applied to the in-vehicle displaying, the wide and narrow wide viewing angle display modes may be switched according to driving conditions. When a vehicle is not in driving, the display device may be maintained under the wide viewing angle display mode, and at the moment, a display picture of the display device may be watched from both a driving position and a co-pilot position. When the vehicle is in driving, the viewing angle on one side of the driving position needs to be shielded in order to guarantee the driving safety, and at the moment, the display device may be switched to the narrow viewing angle display mode. Firstly, the driver image is acquired through the camera to determine the viewing angle formed between the position of the face of the driver and the display surface of the display device. The viewing angles for watching the display picture are different due to different heights of drivers. Therefore, after the viewing angle for watching of the driver is determined at first, the second display device in the display device is controlled through the processor according to this viewing angle, so that the flip angle of the dye molecules in the second display device may just allow the light emitted to the watching position of the driver to be absorbed, and the driver may not watch the display picture of the display device, and the driving safety is ensured. Meanwhile, the dye molecules may only flip towards the same direction, so that a passenger at the co-pilot position will not be affected and may still watch the display picture normally at a viewing angle on the side opposite to the driver. Therefore, a viewing angle switching display mode applied to the in-vehicle display system is realized.

Figure 12:
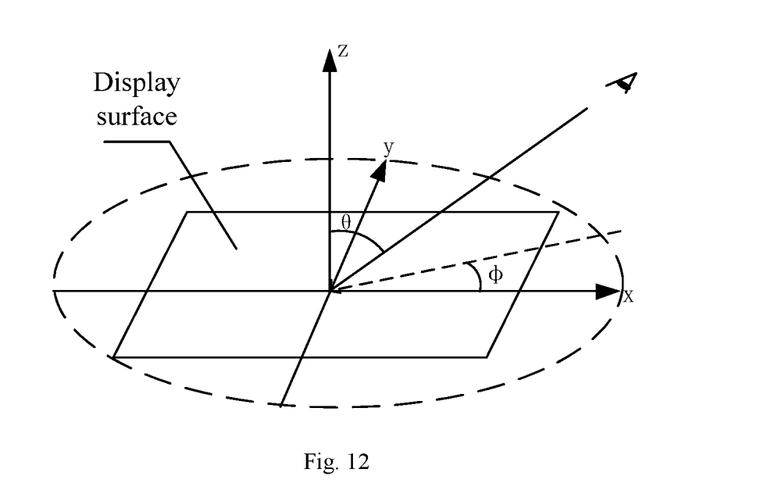
FIG. 12 is a flowchart II of a display method of a display device according to the embodiment of the present disclosure.

FIG. 12 is a schematic diagram of a position relation between a viewing angle and a display panel according to the embodiment of the present disclosure. As shown in FIG. 12, an included angle formed between a visual line of human eyes to the display surface of the display device and the axis z perpendicular to the display surface is a viewing angle formed by the human eyes at a watching position. θ represents the viewing angle formed between the visual line of an audience and the display surface of the display device, and φ represents a polar angle formed by the visual line of the audience in the display surface of the display device. The dye molecules in an initial state are perpendicular to the display surface. When the dye molecules tilt by an angle that is equal to the viewing angle towards a direction deviated from the watching direction of the human eyes, lights incident to the human eyes may be absorbed, and the narrow viewing angle displaying at this viewing angle is realized.

Experimental detection is performed on a viewing angle of the display device adopting the negative liquid crystals and a voltage value on the two sides of the first liquid crystal layer in the embodiment of the present disclosure, and it may be obtained that when the viewing angle θ formed between the face of the driver and the display surface of the display device is 30 to 60 degrees, a voltage, generated by the second signal applied to the first electrode and the second electrode of the second display device, on the two sides of the first liquid crystal layer may be set at 2 to 4 V.

A corresponding relation table of the viewing angle and the voltage on the two sides of the first liquid crystal layer is below.

| Voltage (V) | Transmittance | | | |
| --- | --- | --- | --- | --- |
| | $\theta = 45°$ $\varphi = 0°$ | $\theta = 45°$ $\varphi = 180°$ | $\theta = 30°$ $\varphi = 180°$ | $\theta = 60°$ $\varphi = 180°$ |
| 0 | 60% | 60% | 85% | 40% |
| 1 | 60% | 60% | 85% | 30% |
| 1.5 | 70% | 50% | 60% | 15% |
| 2 | 85% | 25% | 30% | 5% |
| 2.5 | 95% | 5% | 15% | 1.50% |
| 3 | 100% | 1.50% | 6% | 1.50% |
| 3.5 | 85% | 1.50% | 3% | 1.50% |
| 4 | 65% | 1.50% | 1.5% | 1.50% |
| 4.5 | 35% | 1.50% | 1.50% | 1.50% |
| 5 | 10% | 1.50% | 1.50% | 1.50% |
| 5.5 | 1.50% | 1.50% | 1.50% | 1.50% |

$\theta$ represents the viewing angle formed between the visual line of the audience and the display surface of the display device, and $\varphi$ represents the polar angle formed by the visual line of the audience in the display surface of the display device. Each column in the above table represents the transmittance of the display device in this direction when the display device is watched in one direction. Lower transmittance represents that less light from the display device may be received in this direction and the display picture may be seen more difficultly. Higher transmittance represents that more light from the display device may be received in this direction and the display picture may be seen more easily. A curve drawn by the data of each column in the table is as shown in FIG. 13.

The curve corresponding to the first column of the table is a curve with a viewing angle $\theta$ of 45 degrees and a polar angle $\varphi$ of 0 degree. This curve represents that when the second signal changes, the transmittance of the co-pilot position changes. It can be seen that when the applied voltage is about 3 V, the transmittance of the co-pilot position is the highest. Other three curves respectively correspond to relations between the transmittance of the driving position under different viewing angles and the applied voltage.

Figure 13:
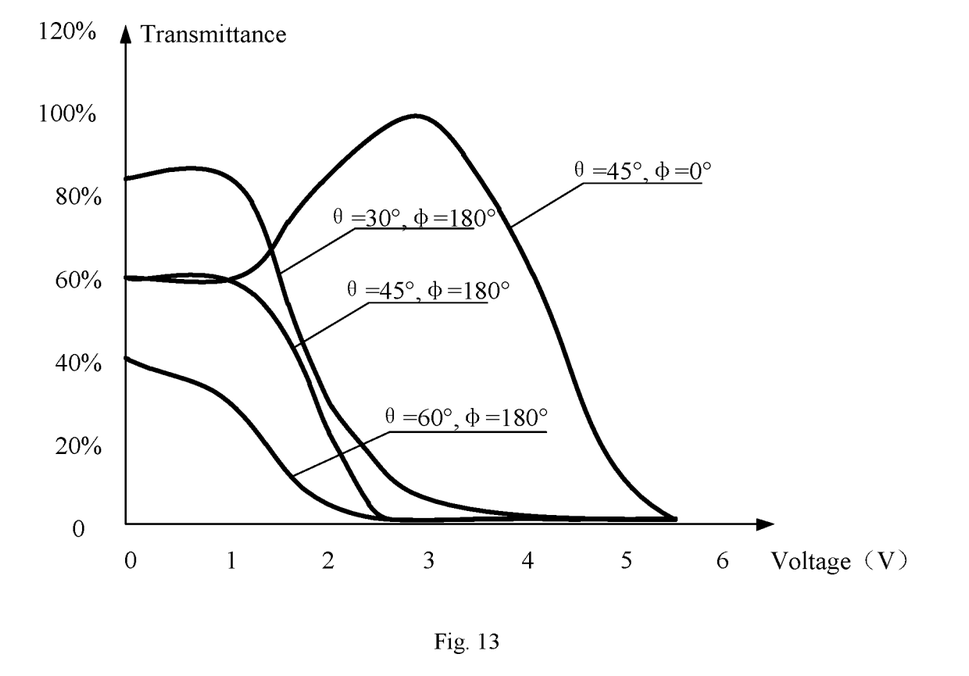
FIG. 13 is a schematic diagram of a position relationship between a viewing angle and a display surface according to the embodiment of the present disclosure.

It can be seen from FIG. 13 that when the viewing angle $\theta$ of the driving position is 45 degrees and the polar angle $\varphi$ is 180 degrees, the application of a voltage of about 2.5 V may lower the transmittance in this direction to minimum; when the viewing angle $\theta$ of the driving position is 30 degrees and the polar angle $\varphi$ is 180 degrees, the application of a voltage of about 4 V may lower the transmittance in this direction to minimum; and when the viewing angle $\theta$ of the driving position is 60 degrees and the polar angle $\varphi$ is 180 degrees, the application of a voltage of about 2 V may lower the transmittance in this direction to minimum. Therefore, the voltage value of the first signal applied to the two sides of the first liquid crystal layer may be adjusted according to different viewing angles for watching where the display picture may not be watched at the main driving position and may be watched normally at the co-pilot position.

It should be noted that the above table data provided by the embodiment of the present embodiment are data measured under conditions of a fixed box thickness and liquid crystals with fixed natures based on the structure of the second display device. In some embodiments, since the structure of the second display device changes to cause a liquid crystal box thickness to change, or when liquid crystal molecules with different natures are adopted, the above corresponding relation between the viewing angle and the voltage may possibly change. Therefore, in one embodiment, the above relation between the viewing angle and the voltage needs to be tested for each display device, so as to obtain a relation table or a relation curve conforming to the currently used display device. The embodiment of the present disclosure does not limit the specific corresponding data of the relation between the viewing angle and the voltage.

In the above display method provided by the embodiment of the present disclosure, the viewing angle for watching may be matched with the data of the voltage applied to the first electrode and the second electrode of the second display device according to the data measured in the above table and curve, and the corresponding data are stored in a control chip, so that when desired viewing angle information is obtained, the control chip may automatically inquire the data to apply a corresponding voltage to the second display device. In one embodiment, a certain viewing angle range may also be matched with the same voltage value, so as to simplify the operation progress. In this way, the viewing angle range may be divided into several continuous partitions. Each partition corresponds to one voltage value. When the viewing angle is detected to belong to a certain partition, a voltage corresponding to the partition is applied to the second display device.

The display method of the display device is specifically described below by taking the situation that the first liquid crystal layer adopts the negative liquid crystal molecules in the second display device for example.

The above step S20 that a first signal is applied to a first electrode and a second electrode of a second display device under the wide viewing angle display mode may include that: a voltage of 0 V is applied to the first electrode and the second electrode of the second display device under the wide viewing angle display mode where the long axis of the dye molecules is perpendicular to the plane of the first substrate.

The initial alignment of the negative liquid crystal molecules is perpendicular to the plane of the first substrate. Under the wide viewing angle display mode, in order to make the long axis of the dye molecules dispersed in the negative liquid crystal molecules perpendicular to the plane of the first substrate, no voltage needs to be applied to the first electrode and the second electrode, and the wide viewing angle displaying may be realized. At the moment, the display picture of the display device may be watched at both the driving position and the co-pilot position.

Figure 14:
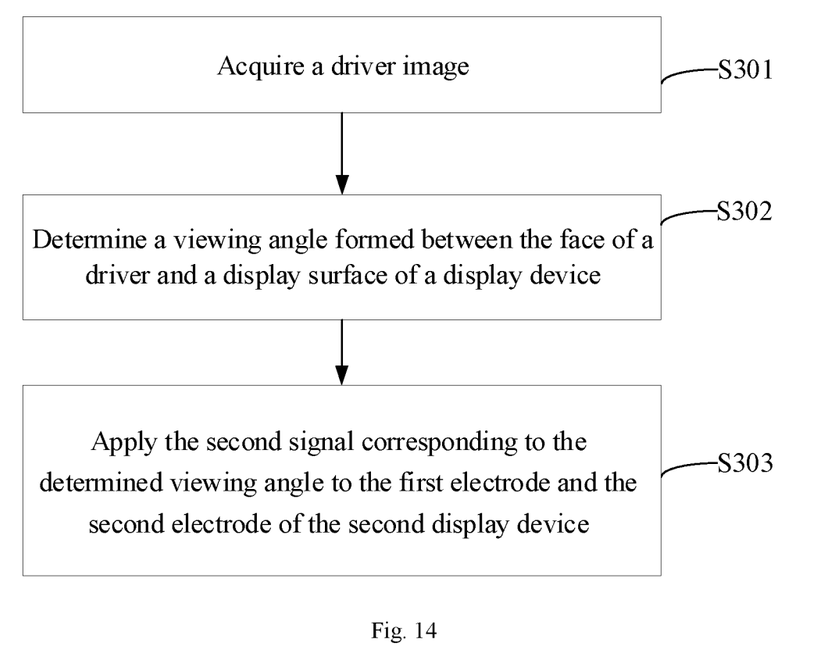
FIG. 14 is a curve graph of a relationship between various viewing angles and applied voltages according to the embodiment of the present disclosure.

The above step S30 that a second signal is applied to the first electrode and the second electrode of the second display device under the narrow viewing angle display mode may specifically include the following operations as shown in FIG. 14.

S301: a driver image is acquired.

S302: a viewing angle formed between the face of a driver and the display surface of the display device is determined according to the driver image.

S303, the second signal corresponding to the determined viewing angle is applied to the first electrode and the second electrode of the second display device according to the pre-configured corresponding relation between the viewing angle and the second signal where the long axis of the dye molecules tilts towards the side deviated from the driver and the included angle between the tilted long axis of the dye molecules and the first substrate is equal to the viewing angle.

When the vehicle is in a driving state, it is not appropriate for the driver to watch the display picture of the display device, and at the moment, the display device may be switched to the narrow viewing angle display mode. However, since drivers have different heights, a viewing angle formed between the current position of the driver and the display surface of the display device needs to be detected at first in order to better shield the display picture from the driving position. At the moment, the camera on the rim of the display device may be turned on to acquire the driver image, and the driver image is transmitted to the processor of the display device, and the processor identifies a viewing angle formed between the face of the driver in the image and the display surface of the display device; and then a second signal corresponding to this viewing angle is applied to the first electrode and the second electrode of the second display device according to the pre-configured corresponding relation between the viewing angle and the second signal where the dye molecules in the first liquid crystal layer tilt at a set angle towards the side deviated from the driving position, so that the light emitted by the first display device to the driving position will be absorbed by the dye molecules, and the display picture of the display device may no longer be watched at the driving position.

The embodiments of the present disclosure provide the display panel, display device and display method, where the display panel includes the first display device, the second display device located on the light-exiting side of the first display device, and the polarizer located between the first display device and the second display device. The second display device includes: the first substrate and the second substrate which are opposite to each other, the first liquid crystal layer located between the first substrate and the second substrate, the dye molecules dispersed in the first liquid crystal layer, the first electrode located between the first liquid crystal layer and the first substrate, and the second electrode located between the first liquid crystal layer and the second substrate. The first signal is applied to the first electrode and the second electrode under the wide viewing angle display mode, and at the moment, the long axis of the liquid crystal molecules and the long axis of the dye molecules in the first liquid crystal layer are perpendicular to the plane of the first substrate; emergent light of the first display device generates polarized light with a polarization direction parallel to the plane of the first substrate after passing through the polarizer; a relatively large included angle is formed between the long axis of the dye devices and the polarization direction of the polarized light, and no light or little light will be absorbed; and there is no difference between a viewing angle formed by the emergent light and a display viewing angle of the first display device, and displaying is performed under the wide viewing angle mode. The second signal is applied to the first electrode and the second electrode under the narrow viewing angle display mode, and at the moment, the long axis of liquid crystal molecules and the long axis of the dye molecules in the first liquid crystal layer form an included angle of 30 to 60 degrees together with the plane of the first substrate; the emergent light of the first display device generates polarized light with a polarization direction parallel to the plane of the first substrate after passing through the polarizer; when the included angle between the long axis of the dye molecules and the plane of the first substrate is maintained at any value within 30 to 60 degrees, the long axis direction of the dye molecules will be parallel to or closely parallel to the polarization direction of part of the emergent light, and at the moment, this part of light may be absorbed by the dye molecules, so that a display picture of the display panel may not be watched from a watching position corresponding to this part of light, and displaying is performed under the narrow viewing angle mode. Therefore, switching between a wide viewing angle and a narrow viewing angle is realized.

What is claimed is:

1. A display panel, comprising:
    a first display device;
    a second display device located on a light-exiting side of the first display device; and
    a polarizer located between the first display device and the second display device;
    wherein the second display device comprises:
        a first substrate and a second substrate which are opposite to each other;
        a first liquid crystal layer located between the first substrate and the second substrate;
        dye molecules dispersed in the first liquid crystal layer;
        a first electrode located between the first liquid crystal layer and the first substrate; and
        a second electrode located between the first liquid crystal layer and the second substrate;
    wherein the first electrode and the second electrode are configured to enable a long axis of the dye molecules to be perpendicular to a plane of the first substrate via a first signal applied to the first electrode and the second electrode under a wide viewing angle display mode; and the first electrode and the second electrode are configured to enable the long axis of the dye molecules and the plane of the first substrate to form an included angle of 30 to 60 degrees via a second signal applied to the first electrode and the second electrode under a narrow viewing angle display mode.

2. The display panel according to claim 1, wherein liquid crystal molecules in the first liquid crystal layer are positive liquid crystal molecules; an initial alignment of the positive liquid crystal molecules is parallel to the plane of the first substrate; and the long axis of the dye molecules is parallel to a long axis of the positive liquid crystal molecules.

3. The display panel according to claim 1, wherein liquid crystal molecules in the first liquid crystal layer are negative liquid crystal molecules; an initial alignment of the negative liquid crystal molecules is perpendicular to the plane of the first substrate; and the long axis of the dye molecules is parallel to a long axis of the negative liquid crystal molecules.

4. The display panel according to claim 1, wherein the first electrode and the second electrode are planar electrodes.

5. The display panel according to claim 1, wherein the first display device comprises:
    a third substrate and a fourth substrate which are opposite to each other;
    a second liquid crystal layer located between the third substrate and the fourth substrate; and
    a lower polarizer located on a side, deviated from the second liquid crystal layer, of the third substrate;
    wherein the polarizer is located between the first substrate and the fourth substrate; and the lower polarizer is perpendicular to a polarization direction of the polarizer.

6. The display panel according to claim 1, wherein the first display device comprises:
    a base substrate;

an organic light emitting diode component and a phase retarder, which are located on a side, facing the polarizer, of the base substrate, wherein the phase retarder is located between the polarizer and the organic light emitting diode component.

7. A display device, comprising:
a display panel, wherein the display panel comprises:
a first display device;
a second display device located on a light-exiting side of the first display device; and
a polarizer located between the first display device and the second display device;
wherein the second display device comprises:
a first substrate and a second substrate which are opposite to each other;
a first liquid crystal layer located between the first substrate and the second substrate;
dye molecules dispersed in the first liquid crystal layer;
a first electrode located between the first liquid crystal layer and the first substrate; and
a second electrode located between the first liquid crystal layer and the second substrate;
wherein the first electrode and the second electrode are configured to enable a long axis of the dye molecules to be perpendicular to a plane of the first substrate via a first signal applied to the first electrode and the second electrode under a wide viewing angle display mode; and the first electrode and the second electrode are configured to enable the long axis of the dye molecules and the plane of the first substrate to form an included angle of 30 to 60 degrees via a second signal applied to the first electrode and the second electrode under a narrow viewing angle display mode.

8. The display device according to claim 7, wherein the first display device is a liquid crystal display device; the display device further comprises: a backlight device located on a side, deviated from the second display device, of the first display device.

9. The display device according to claim 7, wherein the display device is configured for in-vehicle displaying, and the display device further comprises:
a camera arranged on any frame of the display device; and
a processor connected to the camera;
wherein the camera is configured to acquire a driver image and transmit the driver image to the processor; and the processor is configured to determine a viewing angle formed between a face of a driver and a display surface of the display device according to the driver image acquired by the camera, and control the display device to enter the narrow viewing angle display mode corresponding to the viewing angle according to the determined viewing angle where the driver is unable to watch a display picture of the display device.

10. A display method of the display device according to claim 7, comprising:
applying the first signal to the first electrode and the second electrode of the second display device under the wide viewing angle display mode where the long axis of dye molecules is perpendicular to the plane of the first substrate; and
applying the second signal to the first electrode and the second electrode of the second display device under the narrow viewing angle display mode where the long axis of the dye molecules and the plane of the first substrate form the included angle of 30 to 60 degrees.

11. The display method according to claim 10, wherein liquid crystal molecules in the first liquid crystal layer are positive liquid crystal molecules; and
a voltage generated by the applied first signal on two sides of the first liquid crystal layer is greater than a voltage generated by the applied second signal on the two sides of the first liquid crystal layer.

12. The display method according to claim 10, wherein liquid crystal molecules in the first liquid crystal layer are negative liquid crystal molecules; and
a voltage generated by the applied first signal on two sides of the first liquid crystal layer is less than a voltage generated by the applied second signal on the two sides of the first liquid crystal layer.

13. The display method according to claim 12, wherein the display device is configured for in-vehicle displaying, and the display device comprises: a camera arranged on any frame of the display device and a processor connected to the camera; and
the display method further comprises:
acquiring, by the camera, a driver image, and transmitting the driver image to the processor; and
determining, by the processor, a viewing angle formed between a face of a driver and a display surface of the display device according to the driver image acquired by the camera, and controlling the display device to enter the narrow viewing angle display mode corresponding to the viewing angle according to the determined viewing angle where the driver is unable to watch a display picture of the display device;
wherein the viewing angle is an included angle formed between a visual line of the driver and a direction perpendicular to the display panel of the display device.

14. The display method according to claim 13, wherein the applying the first signal to the first electrode and the second electrode of the second display device under the wide viewing angle display mode comprises:
applying a voltage of 0 V to the first electrode and the second electrode of the second display device under the wide viewing angle display mode where the long axis of the dye molecule is perpendicular to the plane of the first substrate.

15. The display method according to claim 13, wherein the applying the second signal to the first electrode and the second electrode of the second display device under the narrow viewing angle display mode comprises:
acquiring a driver image;
determining the viewing angle formed between the face of the driver and the display surface of the display device according to the driver image; and
applying the second signal corresponding to the determined viewing angle to the first electrode and the second electrode of the second display device according to a preset corresponding relationship between the viewing angle and the second signal where the long axis of the dye molecules tilt towards a side deviated from the driver, and the included angle between the tilted long axis of the dye molecules and the first substrate is equal to the viewing angle.

16. The display method according to claim 15, wherein when the viewing angle formed between the face of the driver and the display surface of the display device is 30 to 60 degrees, the voltage, generated by the second signal applied to the first electrode and the second electrode of the second display device, on the two sides of the first liquid crystal layer is 2 to 4 V.

* * * * *